US006748088B1

(12) United States Patent
Schaaf

(10) Patent No.: US 6,748,088 B1
(45) Date of Patent: Jun. 8, 2004

(54) METHOD AND DEVICE FOR OPERATING A MICROPHONE SYSTEM, ESPECIALLY IN A MOTOR VEHICLE

(75) Inventor: Klaus Schaaf, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/646,826

(22) PCT Filed: Feb. 17, 1999

(86) PCT No.: PCT/EP99/01037

§ 371 (c)(1), (2), (4) Date: Nov. 20, 2000

(87) PCT Pub. No.: WO99/49698

PCT Pub. Date: Sep. 30, 1999

(30) Foreign Application Priority Data

Mar. 23, 1998 (DE) ........................................ 198 12 697

(51) Int. Cl.7 ............................ H04R 3/00; H04R 1/02; H04B 1/00; B60R 21/32

(52) U.S. Cl. ............................ 381/92; 381/86; 381/91; 280/735

(58) Field of Search ............................ 381/92, 91, 110, 381/86; 280/735; 367/118–127

(56) References Cited

U.S. PATENT DOCUMENTS

| | | | | |
|---|---|---|---|---|
| 5,366,241 A | | 11/1994 | Kithil | |
| 5,539,859 A | | 7/1996 | Robbe et al. | |
| 5,600,727 A | * | 2/1997 | Sibbald et al. | 381/26 |
| 5,602,962 A | | 2/1997 | Kellelrmann | |
| 5,715,319 A | * | 2/1998 | Chu | 381/26 |
| 5,748,748 A | * | 5/1998 | Fischer et al. | 381/71.4 |
| 5,787,183 A | * | 7/1998 | Chu et al. | 381/92 |
| 5,829,782 A | * | 11/1998 | Breed et al. | 280/735 |
| 6,192,134 B1 | * | 2/2001 | White et al. | 381/92 |
| 6,529,608 B2 | * | 3/2003 | Gersabeck et al. | 381/110 |
| 6,600,824 B1 | * | 7/2003 | Matsuo | 381/92 |
| 6,618,485 B1 | * | 9/2003 | Matsuo | 381/92 |

FOREIGN PATENT DOCUMENTS

| | | |
|---|---|---|
| DE | 195 33 541 | 3/1997 |
| DE | 196 08 869 | 9/1997 |
| DE | 693 14 514 | 2/1998 |
| DE | 40 29 697 | 5/1998 |
| EP | 0 472 356 | 2/1992 |
| EP | 0 721 178 | 7/1996 |
| EP | 0 773 531 | 5/1997 |
| EP | 0 795 851 | 9/1997 |
| WO | WO 95/34983 | 12/1995 |
| WO | WO 96 41214 | 12/1996 |

OTHER PUBLICATIONS

* Y. Grenier, "A Microphone Array For Car Environments", Speech Processing 1, San Francisco, Mar. 23–26, 1992.

* cited by examiner

*Primary Examiner*—Minsun Oh Harvey
*Assistant Examiner*—Laura A. Grier
(74) *Attorney, Agent, or Firm*—Kenyon & Kenyon

(57) ABSTRACT

A device for operating a microphone system, particularly in a motor vehicle, detects speech sound in several different physical locations to track a virtual microphone location, which is optimized in relation to a moving speech source. From the evaluation of variables, such as operating time, phase and/or amplitude, the individual microphone locations are virtually weighted, and the audio signals from the microphones are added or otherwise combined.

17 Claims, 2 Drawing Sheets

Figure 1:
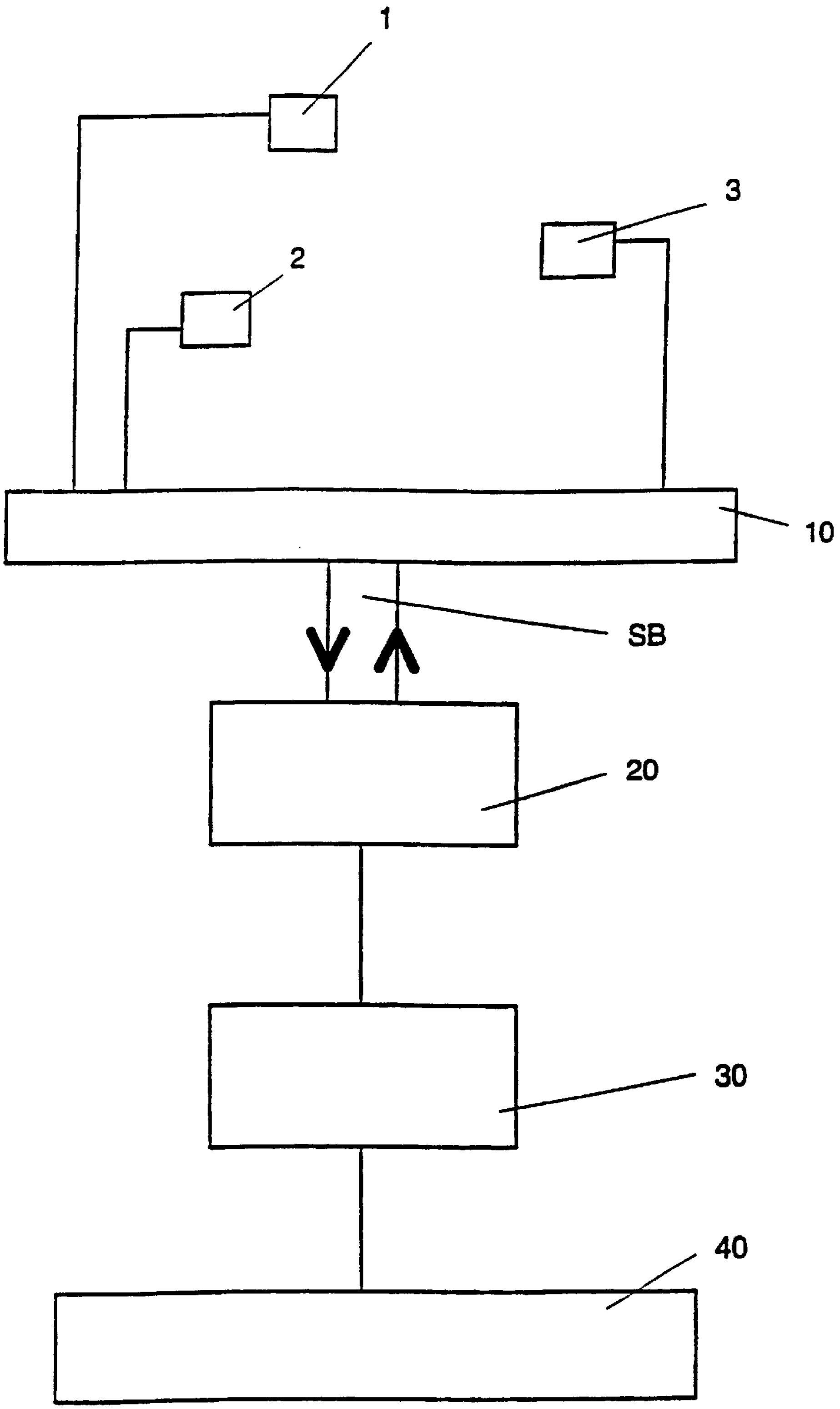

METHOD AND DEVICE FOR OPERATING A MICROPHONE SYSTEM, ESPECIALLY IN A MOTOR VEHICLE

FIELD OF THE INVENTION

The present invention relates to a method, and a device for operating a microphone system; particularly in a motor vehicle.

BACKGROUND INFORMATION

Microphones and microphone systems are especially needed in motor vehicles for operating the so-called hands-free telephone. However, they are also needed in voice amplification and communication systems, and in systems for actively suppressing noise.

In this regard, it is important that the sound is, or can be picked up in direct proximity to the head of the vehicle occupant or the vehicle driver. To this end, microphones are generally disposed in the area of the dashboard, in the area of the roof panel, or on the interior mirror. Simple microphones or microphone systems often present a problem for otherwise simple intercoms in car phones, or also for voice-controlled input interfaces on electronic devices. In this case, the voice messages are superposed by driving noises, which is not only problematic with handsfree telephones, but also with voice-controlled input units.

A voice-operated control device for components in motor vehicles is described in, for example, German Unexamined Patent Application No. 196 08 869, where the operation of the control device by means of speech generates a check-back signal, through which it can be determined whether the control device has correctly received the voice-controlled command. Even with regard to its microphone arrangement, a voice-operated control device of this type is only based on a conventional microphone design or microphone arrangement.

A similar type of voice-controlled operating control method is described in German Patent No. 195 33 541. However, the voice-control is treated as such here. In order to achieve secure control, a very expensive voice recognition method is used in which the aspects of noise reduction, echo compensation, feature extraction, and syntax and semantics testing are processed separately from each other. In this case, the aim is simply to postprocess the available voice signals in the best possible manner. An improvement of the voice quality as such, i. e. an improvement of the voice-signal reception, is not considered here.

EP 0721178 A 2 describes a multichannel communication system having a plurality of microphones and a plurality of loudspeakers. In this case, the entire system is designed for at least two people speaking, who are connected to each other in transmit/receive mode. The transmitting means select the voice message from an entire noise background. In a motor-vehicle application, a so-called error or comparison microphone is brought very close to the person speaking, by the seat belt. The location of the microphone is fixed here. Furthermore, the design in this document is for transmit/receive mode for two or more persons.

Along these lines, a frequency-selective control system for acoustic systems is known from EP 0773531 A 2. In this case, the prevention of oversteering is in the forefront. Improving the reception quality of the voice message is not a consideration here. A similar type of system is also known from EP 0721179 A 2. The main objective of the adaptive, tonal control system described therein for eliminating stability problems is to prevent the above-mentioned oversteering, as well.

U.S. Pat. No. 5,539,859 describes a method for reducing noise, which relates exclusively to two microphones acting permanently in reciprocity to each other. A spatial determination specially for obtaining a virtual microphone location is not conducted.

EP 0472356 A1 describes a device, where only the location of the speech or command source is determined by microphones.

This cross-section of the related art indicates that one is principally concerned with improving the already received voice signal. However, improving the reception quality at the location where the speech is generated is frequently, if not fundamentally, neglected.

Therefore, the present invention is based on the object of further developing a method and a device of the species, to the effect that the reception quality of the voice signal input into the system is fundamentally improved.

The stated object of the present invention is achieved by a method of the species, using the characterizing features of Claim 1.

With regard to a device of the species, the stated object of the present invention is achieved by the characterizing features of Claim 4.

Additional advantageous refinements of the method according to the invention are specified in claims 2 through 3, and ongoing refinements regarding the device of the present invention are mentioned in the remaining claims 5 through 8.

The central idea of the present invention, in regard to both the method and the device, is to establish a virtual, optimized microphone location. Normally, this is virtually defined there as the location of the speech source, i.e. the location of the head of the person who is speaking. This so-called spatial noise- or speech-source recognition can be accomplished, e.g. using propagation-delay measurement. In a system of multiple microphones, propagation-delay measurement enables the spatial position of the speech source to be detected while one is speaking. The microphones are added up according to magnitude and phase, in such a manner, that the useful signals are added up and amplified, but the interference signals not correlated to the useful signal are optimally blanked out. Consequently, all of the microphones have a supporting function, and are included in the evaluation. This is not a question of post-processing the microphone signal, but rather improving the speech signal fed into the transmission chain.

The root idea of both the method and device according to the present invention is especially advantageous, because a microphone selected in this manner, or the propagation-delay measurement forming the basis of this, can be combined with a head-position determination of the person speaking.

Means for ascertaining the position of the head, which are used for controlling the air bag, are indeed known from U.S. Pat. No. 5,366,241. However, the head position is detected here using generated sound waves. A combination of this with a voice-operated microphone is not mentioned.

In an additional advantageous refinement, the data on the head position can then be generated via the speech-source recognition or the so-called virtual microphone-location determination, these data being qualified and usable for controlling the safety systems. That is, the head position is also determined here simultaneously to the normal speaking with car phones or speech-input devices, without having to provide additional, more extensive means. So if the head is in an unfavorable position relative to the air bag system, the safety system can be controlled in an emergency, to prevent the air bag from being deployed.

Therefore, the system is multifunctional as a whole. However, it is important that the speech quality is increased at the detection location. This leads to a clearer transmission while talking on the car phone. Furthermore, the voice commands for units in the motor vehicle controlled by voice input are more easily recognized and carried out.

The present invention is represented in the drawing and described below in detail.

The figures show:

FIG. 1 an overall view of the system design; and

Figure 2:
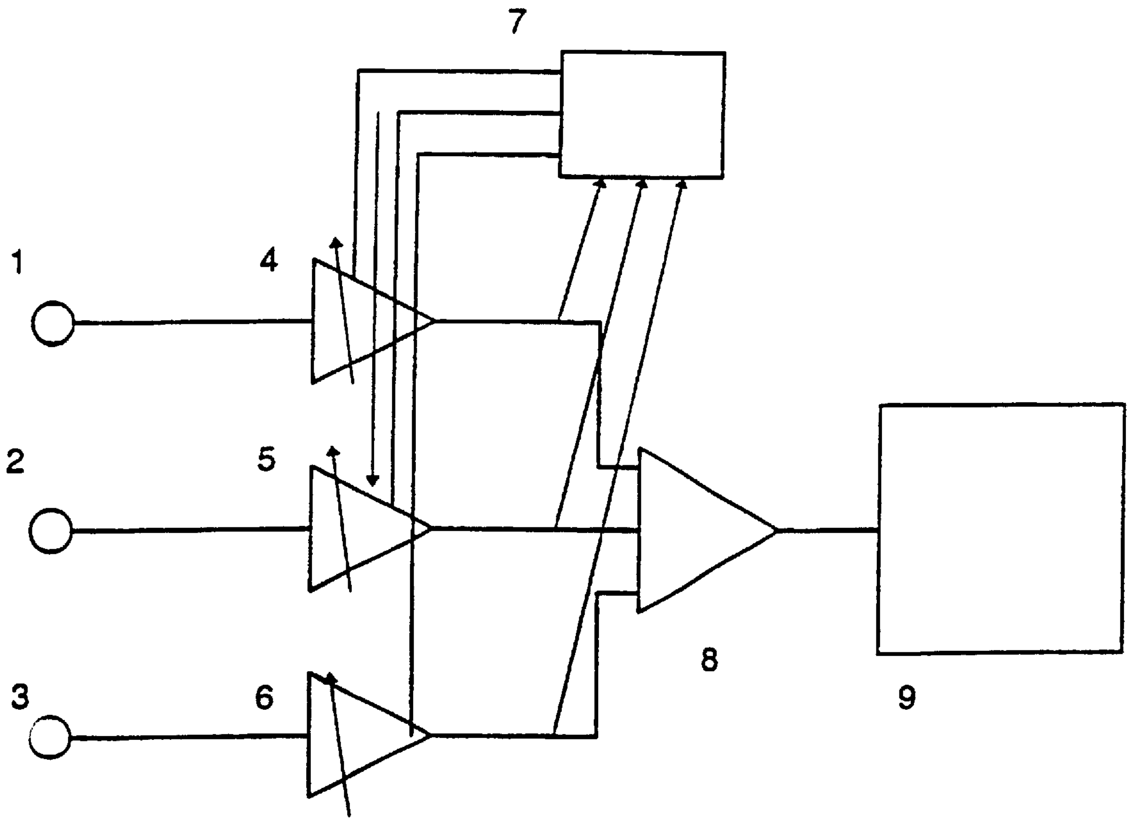

FIG. 2 an exemplary embodiment for an electronic design according to the present invention.

Represented in FIG. 1 is the layout of the principal elements, as well as how they are functionally connected to each other. Detailed representations are not included here, and only a general view of the system is shown.

A plurality of microphones 1, 2, 3 is arranged inside the motor vehicle, so as to be spatially distributed. By favorably positioning the microphones, a configuration having two microphones can also be sufficient. In addition, it can be quite advantageous to set up even more than three microphones. In this case, the choice of microphone location is arbitrary, and therefore, the microphones can either be permanently installed in panels or spatially distributed in the motor vehicle, using additional mounting elements.

However, the fact remains that a plurality of microphones is needed per space. However, 3 microphones are needed for an exact 3-D localization. In this context, the microphone locations must be spread out to form a 3-dimensional space, and may not lie in the same plane. On the other hand, the propagation-delay or correlation measurement is not sufficiently accurate, when the microphones are too far removed from each other.

In this case, all of the microphones supply corresponding signals, which are brought together at a signal analyzer 10. If a voice message is now given in the vehicle, then it is picked up by all of the microphones. But since these are spatially distributed, the quality of the received signal is, on one hand, variable and on the other hand, propagation-time differences generated by the limited sonic velocity even occur in the most accurate analysis. Thus, the propagation delay is determined inside signal analyzer 10, and the location where the noise or speech is generated is determined from the correlation of all the microphone signals. Then, the spatial coordinates ascertained for the speech source in this manner allow the so-called virtual microphone location to be determined electronically. In other words, through correlation all of the signals, the plurality of microphone signals from the distributed microphones yields the aforesaid virtual microphone location, which simulates the most suitable position relative to the head of the person speaking. If the position of the head now changes, then the array of multiple microphones correspondingly registers this again, and using the aforesaid propagation-delay measurement, virtually tracks the virtual microphone location by shifting the weighting of the microphone signals. Because the analysis is done electronically, the entire method is implemented almost immediately, i.e. without any significant, noticeable time delay.

However, another method can consist in continually evaluating all microphone signals, and using a plausibility check to be able to continuously verify the voice message by comparing the individual microphone signals.

Regardless of the method presently being used, the present invention provides for signal analyzer 10 being connected in series to a microphone-location-determination unit 20 in a manner allowing signals to travel bidirectionally between the two. Inside this microphone-location-determination unit, either a receiving-lobe determination and a corresponding calculation can be carried out, or the selection of the current main microphone can be established.

In turn, microphone-location-determination unit 20 is in signal communication with a calculating unit 30, by means of which the position of the head is determined from the acquired data or signals. In this connection, the ongoing calculation can consist in, e.g. a comparison with patterns. The comparison to standards can thereby shorten the calculation time considerably, since the calculation does not have to be carried out each time from the beginning. In view of releasing the air bag, the so-called "out of position" head position of the person speaking can be recognized immediately. Therefore, calculating unit 30 is connected in outgoing circuit to the signal generator for the safety systems 40, such as air bag, seat-belt tensioner, and the like.

Bidirectional connection SB between signal analyzer 10 and microphone-location-determination unit 20 allows the microphones to be controlled as a function of the head position of the person speaking, which is the focus of the present invention.

If the head of the corresponding person now moves while he or she is speaking, the present invention, as it were, tracks the virtual microphone location. That is, if the speech begins with a positionally optimized microphone 1, and the position changes while speaking, then the optimum microphone location is tracked during the speech, e.g. by shifting to microphone 2 as the quasi-dominant microphone. This means that the virtual microphone location once determined to be optimal changes naturally, when the head position of the person speaking changes. This is covered by the nature of the present invention and achieved here in an advantageously simple manner. It is a special case, when the virtual microphone location coincides with one of the actual microphones. However, a collective microphone-signal analysis is mainly carried out, in which the directivity characteristic is adjusted to the changed position of the head by correspondingly shifting the quasi hierarchy in the evaluation of the individual microphone signals.

The microphone locations of the distributed microphones are dependent on the vehicle configuration. Therefore, an array of at least 2 microphones per person is generally advantageous. An uneven number of microphones can also be used, one or more microphones being assigned to a plurality of persons.

FIG. 2 shows a simple, basic circuit diagram for implementing the mode of operation that is only represented systematically in FIG. 1.

Microphones 1,2,3 are connected to adjustable amplifiers 4,5,6, respectively. These adjustable amplifiers are controlled by evaluating device 7. Two of the adjustable amplifiers can also be coupled on the control side or correlatingly coupled. In addition, the individual amplifier output signals can be transmitted to aforesaid evaluating device 7, as well. At the same time, the amplified microphone signals are fed to an adder 8, whose output is connected up with device 9 for transmitting the audio signals.

What is claimed is:

1. A method for operating a microphone system, comprising the steps of:

(a) detecting a sound at a plurality of spatially distributed locations;

(b) simultaneously evaluating at least one variable of the sound detected by each of the microphones;

(c) weighting the locations of the microphones and combining audio signals from the microphones based on the evaluating step (b);

(d) tracking a changed location in 3-dimensional space of a source of the sound based on a directivity of the microphone system by shifting at least one of the variables of the microphone signals;

(e) optimizing in 3-dimensional space a virtual microphone location in relation to the position in 3-dimensional space of a movable sound source;

(f) feeding the signals from the microphones to a transmission device after the evaluating step (b).

2. The method according to claim 1, wherein the at least one variable includes at least one of a propagation delay, a phase and an amplitude.

3. The method according to claim 1, further comprising the step of analyzing the microphone signals by evaluating a sound propagation time of each microphone.

4. The method according to claim 1, wherein the spatially distributed locations are non-coplanar.

5. The method according to claim 1, further comprising the step of arranging the plurality of spatially distributed locations in a motor vehicle.

6. The method according to claim 1, further comprising the step of providing a microphone at each of the spatially distributed locations.

7. A method for operating a microphone system, comprising the steps of:

(a) detecting a sound at a plurality of spatially distributed locations;

(b) simultaneously evaluating at least one variable of the sound detected by each of the microphones;

(c) weighting the locations of the microphones and combining audio signals from the microphones based on the evaluating step (b);

(d) tracking a changed location in 3-dimensional space of a source of the sound based on a directivity of the microphone system by shifting at least one of the variables of the microphone signals;

(e) optimizing in 3-dimensional space a virtual microphone location in relation to the position in 3-dimensional space of a movable sound source;

(f) feeding the signals from the microphones to a transmission device after the evaluating step (b);

wherein the microphone system is provided in a motor vehicle.

8. The method according to claim 7, further comprising the steps of:

determining a position of the sound source based on the at least one variable; and determining whether to trigger at least one safety system of the motor vehicle in accordance with the determined sound source position.

9. The method according to claim 8, wherein the safety system includes an air bag system.

10. A device for operating a microphone system, the microphone system including at least two spatially distributed microphones, sound signals being feedable by the microphone system into at least one of an audio system, a telephone system, a voice-controlled input unit and an active noise compensation system, the device comprising:

a signal analyzer configured to combine the signals from each of the microphones;

an arrangement including a microphone-location-determination unit logically and bidirectionally connected to the signal analyzer, the microphone-location-determination unit configured to ascertain a virtual microphone location in 3-dimensional space and to transmit a return signal to the signal analyzer to perform at least one of controlling and selecting one of an optimum microphone in 3-dimensional space relative to the sound source and a directivity characteristic of the microphone system.

11. The device according to claim 10, wherein the arrangement further includes a calculation unit.

12. The device according to claim 11, wherein the calculation unit is configured to determine a position of the sound source and to transmit a blocking signal to at least one safety system of a motor vehicle in accordance with an evaluation of the position.

13. The device according to claim 12, wherein the safety system includes at least one of an air bag system and a seat-belt tensioner.

14. The device according to claim 11, wherein the microphone-location-determination unit is configured to determine the virtual microphone location in accordance with a simultaneous evaluation of each of the microphone signals to thereby track a movable position of the sound source.

15. The device according to claim 10, further comprising:

at least two adjustable amplifiers, each of the adjustable amplifiers being connected to an output of a respective one of the microphones;

an evaluating device configured to adjust the amplifiers;

an adder, an output of each amplifier being wired to the adder; and a transmitter configured to transmit audio signals, the adder being connected to the transmitter;

wherein the output of each amplifier is connected to the evaluating device in parallel with the adder to thereby define an information feedback loop.

16. The device according to claim 10, wherein the microphone system is provided in a motor vehicle.

17. The device according to claim 10, wherein the spatially distributed microphones are non-coplanar.

* * * * *